United States Patent
Wentink (10) Patent No.: US 8,358,612 B2
(45) Date of Patent: Jan. 22, 2013

(54) POWER SAVE IMPROVEMENT DURING A NETWORK ALLOCATION VECTOR PERIOD

(75) Inventor: Menzo Wentink, Utrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 1370 days.

(21) Appl. No.: 11/686,147

(22) Filed: Mar. 14, 2007

(65) Prior Publication Data

US 2007/0218860 A1    Sep. 20, 2007

Related U.S. Application Data

(60) Provisional application No. 60/782,628, filed on Mar. 14, 2006.

(51) Int. Cl.
*H04W 4/00* (2009.01)
(52) U.S. Cl. ............. 370/328; 455/422.1; 455/450
(58) Field of Classification Search .......... 370/328, 370/329; 455/422.1, 450, 452.2
See application file for complete search history.

(56) References Cited

U.S. PATENT DOCUMENTS

| 5,241,542 | A | * | 8/1993 | Natarajan et al. | 370/311 |
| 7,054,329 | B2 | * | 5/2006 | Cervello et al. | 370/447 |
| 7,397,785 | B2 | * | 7/2008 | Wu et al. | 370/350 |
| 2003/0117959 | A1 | * | 6/2003 | Taranov | 370/241 |
| 2005/0058081 | A1 | * | 3/2005 | Elliott | 370/252 |
| 2007/0019592 | A1 | * | 1/2007 | Otsuki | 370/338 |
| 2007/0097867 | A1 | * | 5/2007 | Kneckt et al. | 370/236 |

OTHER PUBLICATIONS

Teerawat Issariyakul, Ekram Hossain, Dong In Kim, "Medium Access Control protocols for wireless mobile ad hoc networks: issues and approaches", Nov. 25, 2003, Wireless Communications and Mobile Computing.*

* cited by examiner

*Primary Examiner* — Vladimir Magloire (57) ABSTRACT

Included are embodiments for operating in a wireless environment. At least one embodiment of a method includes setting a first data frame for transmission from a first device to a second device, wherein the first device is configured to operate in a normal power mode that includes utilization of a plurality of active components, wherein setting the first data frame includes determining a time period of communicative inactivity.

23 Claims, 8 Drawing Sheets

POWER SAVE IMPROVEMENT DURING A NETWORK ALLOCATION VECTOR PERIOD

CROSS REFERENCE

This application claims the benefit of U.S. Provisional Application 60/782,628, filed Mar. 14, 2006, which is incorporated by reference in its entirety.

BACKGROUND

With the emergence of wireless communications, a plurality of wireless protocols such as Wireless Fidelity (WIFI), Session Initiation Protocol (SIP), Worldwide Interoperability for Microwave Access (WiMAX), etc. have emerged. Utilization of one or more of the wireless protocols have provided users with the ability to communicate with other users, computers, etc. without the constraints of a wired connection. To further facilitate mobility, many communications devices also utilize wireless power sources, such as batteries. As many of these wireless communications devices utilize battery power, conserving power to extend battery life has emerged as a priority.

As such, many communications devices are configured to enter a power save mode, during which time the communications device may shut down one or more components, thereby conserving power. While utilization of this power save mode may provide power conservation, problems may arise in determining when the communication device should resume normal operation and/or when the communication device should enter the power save mode.

Thus, a heretofore unaddressed need exists in the industry to address the aforementioned deficiencies and inadequacies.

SUMMARY

Included are embodiments for operating in a wireless environment. At least one embodiment of a method includes setting a first data frame for transmission from a first device to a second device, wherein the first device is configured to operate in a normal power mode that includes utilization of a plurality of active components, wherein setting the first data frame includes determining a time period of communicative inactivity.

Also included are embodiments of a system for operating in a wireless environment. At least one embodiment of a system includes means for setting a first data frame for transmission from a first device to a second device, wherein the first device is configured to operate in a normal power mode that includes utilization of a plurality of active components, wherein setting the first data frame includes determining a time period of communicative inactivity.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Unscheduled Asynchronous Power Save Delivery (U-APSD) is a power save mechanism for 802.11 based systems, in which the communications device sends a trigger frame to an access point (for instance an uplink voice frame), which is then acknowledged by the access point. At some time after receiving the trigger frame, the access point responds with the buffered downlink traffic. The time for the response to begin may take some time, because the buffered data may be stored in a portion of the access point's memory, which may have higher access latency, due to the design of the access point and the possibly large amount of data to buffer at the access point.

During the turnaround time, the communications device may remain in a normal operation mode and in the receive mode until the communications device receives the access point response. On the final buffered downlink frame, the access point may set an End Of Service Period (EOSP) bit, which is an indication for the communications device that the service period has ended and that it can return to a power save mode, where at least one of the active components utilized during normal operation is deactivated during a period of communicative inactivity. Similarly, Power Save Poll (PS-Poll) based power saving may operate in a similar fashion, except that there may be a single downlink Media Access Control (MAC) Protocol Data Unit (MPDU).

An issue with U-APSD and PS-Poll is that the communications device may remain in the active receive mode during the access point turnaround time, which may, in some cases, be the dominant time in the exchange. As the active receive mode may consume power, battery life may be shortened.

Additionally, other stations may gain access to the medium between the request and the response. As such, embodiments of this disclosure provide possible solutions to solve this and other problems.

In at least one exemplary embodiment, the communications device may be configured to set a Network Allocation Vector (NAV) on an uplink trigger frame (a U-APSD trigger frame and/or other type of trigger frame), which covers a time equal to or longer than the access point turnaround time. During the NAV time, no transmissions will be started, and the communications device may switch off the receiver and possibly other components of the system when the access point interprets the duration value from the trigger frame as a time during which the communications device can not be reached. The NAV also reduces the probability that another transmission may capture the medium before the access point starts a downlink response transmission, and may allow the AP to access the medium without contention.

There may be several ways to determine the length of the turnaround time and the NAV. One way is to preconfigure a fixed time based on the measurements on existing equipment. Another way is to actively determine the average response time for several initial service periods for which no NAV is set on the trigger frame. Intermediate transmissions to other stations should not be present during this time, in order to obtain an accurate measure. After the determination, the average turnaround time may be used to set the NAV, or the highest measured turnaround time, to minimize the active receive time.

The turnaround time may also be announced by the access point, either as a generic value inside a beacon and probe response or as an individual value in association response or Add Traffic Specification (ADDTS) response. If the access point guarantees that the indicated time is the minimum response time, the communications device does not have to set a NAV on the trigger frame in order to enter the sleep mode during that time, but this may help keep other communications devices from capturing the medium. When the access point cannot guarantee that the NAV time is the minimum time, the communications device sets a NAV at the access point to avoid too early transmission by the access point. The access point may use priority access after the NAV, so as to avoid other communications devices from capturing the medium first.

Additionally, the communications device may cease putting a NAV on the trigger frame when the communications device determines that the access point transmits traffic to other destinations before responding to the communications device itself. In this case, the communications device may attempt to enter the power save mode during the transmissions when the communications device determines that the transmissions are destined for other communications devices (e.g., when an A1 field of a MAC header does not match a MAC address).

The NAV may also be set on a protection frame, which precedes the trigger frame, such as a Clear To Send (CTS) frame in order to enter the sleep mode during that time. This technique may also be used to cover the period between a PS-Poll and the data frame response. The access point may receive priority medium access at the end of a NAV, which was set on a trigger frame. For instance, the access point may start transmitting the response frame immediately when the NAV ends (the communications device may be set in the active receive mode by that time). The access point may receive medium access without contention when the NAV on the protection frame is set to a shorter period than the NAV on the trigger frame, so that the access point may count down its backoff while other nodes still have their NAV set.

In another embodiment, the communications device sends a Contention Free End (CF-End) frame when the communications device assumes or determines that the access point is ready for transmitting the downlink data frame. The CF-End may contain a Basic Service Set Identifier (BSSID), which is the access point's MAC address, and the access point may use the BSSID to respond with the buffered traffic after a Short Interframe Space (SIFS). In this way, there may be no need for a backoff prior to the transmission of the downlink frame.

Similarly, the communications device may send a frame to the access point during the NAV, which grants the access point access to the medium after a SIFS, but without resetting the NAV (like the CF-End frame does). An advantage of the latter technique is that the access point's response still falls under the NAV protection set by the communications device. Both techniques may utilize the assistance of the access point and are less attractive for that reason.

Similarly, the access point may set a NAV on the ACK frame, which acknowledges the trigger frame, to cover for the expected duration of the turnaround time. The communications device may interpret this as an indication that the access point will not transmit the response within that time, allowing the communications device to disable the receive mode and enter a power save mode for that time period. The access point may also use the NAV to gain preferred access to the medium without contention.

Figure 1:
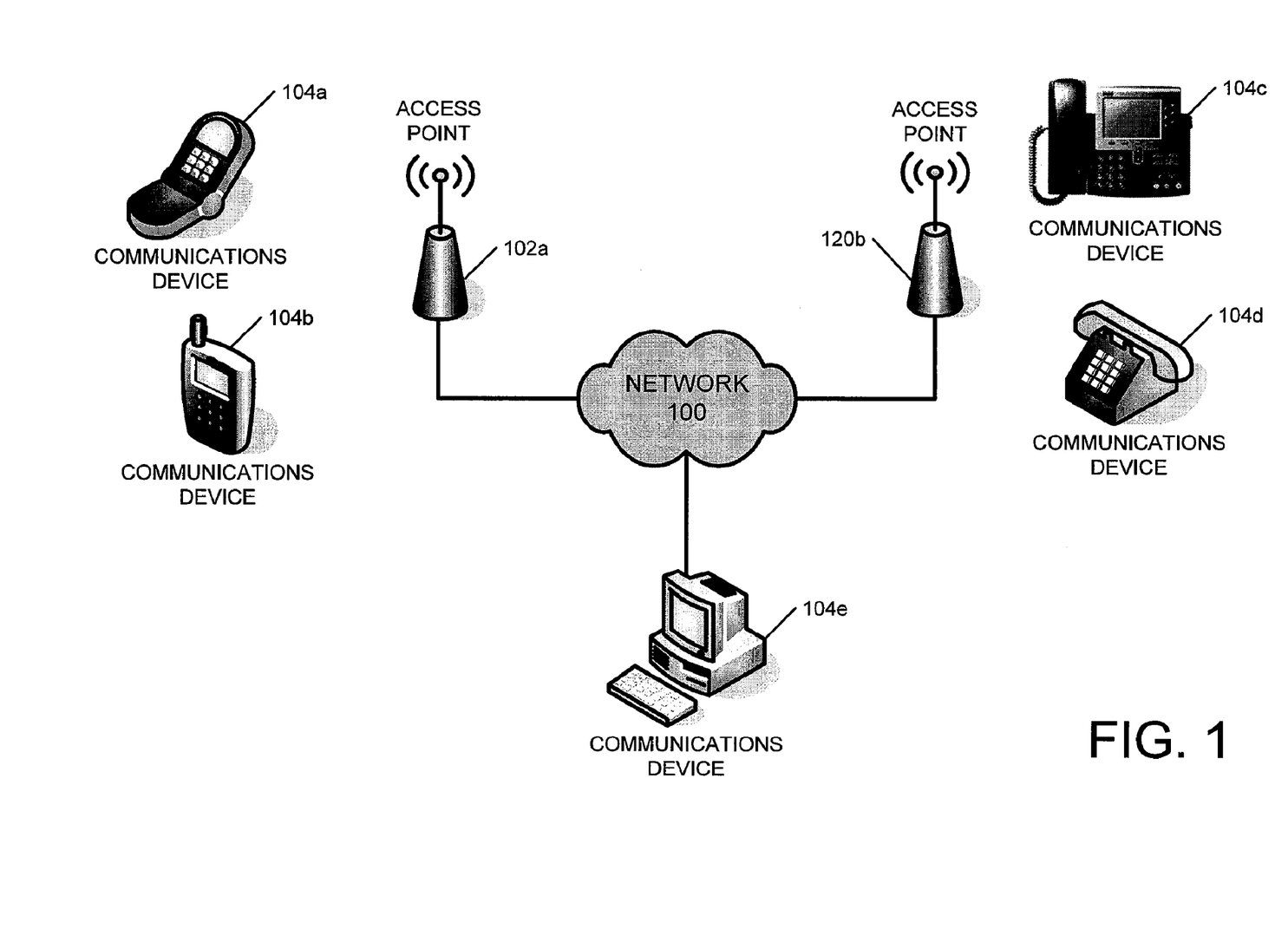
FIG. 1 is an exemplary embodiment of a network configuration for communicating data between communication devices via an access point.

Referring now to the drawings, FIG. 1 is an exemplary embodiment of a network configuration for communicating data between communication devices via an access point. As illustrated in the nonlimiting example of FIG. 1, a network 100 may be coupled to access points 102a and 102b. The access points 102a and 102b can be configured to provide wireless communications to communication devices 104a, 104b, 104c and/or 104d. Depending on the particular configuration, the communications devices 104 may include a personal computer, a laptop computer, a mobile telephone, a Personal Digital Assistant, and/or other device configured for wirelessly sending and/or receiving data.

More specifically, depending on the particular configuration, the access points 102a and/or 102b may be configured for providing WIFI services, WiMAX services, wireless SIP services and/or other wireless communication services. Additionally, the communication device 104b may be coupled to the network 100 (via a wired and/or wireless connection) for storing communications between the communication device 104e and/or another communication device 104 coupled to the network 100.

The network 100 may include a Public Switched Telephone Network (PSTN), a Voice over Internet Protocol (VoIP) network, an Integrated Services Digital Network (ISDN), a cellular network, and/or other mediums for communicating data between communication devices. More specifically, while the communications devices 104a and 104b may be configured for WIFI communications (including, but not limited to 802.11, 802.11b, 802.11a/b, 802.11g, and/or 802.11n), a communications device 104e may be coupled to the network 100 and may facilitate communication between users on the communications device 104a and users on the communications device 104e, even though the communications device 104e may be configured for PSTN communications, as opposed to VoIP communications.

In operation, the user device 104 may be configured to send data to and receive data from the access point 102. As operating in normal operation mode, while not sending data to and receiving data from the access point 102 may consume large amounts of power, the communications devices 104 may be configured to enter a power save mode to conserve power and extend battery charge. However, problems may arise in determining when the communications device should resume normal operation from the power save mode to send and receive communications data.

Figure 2:
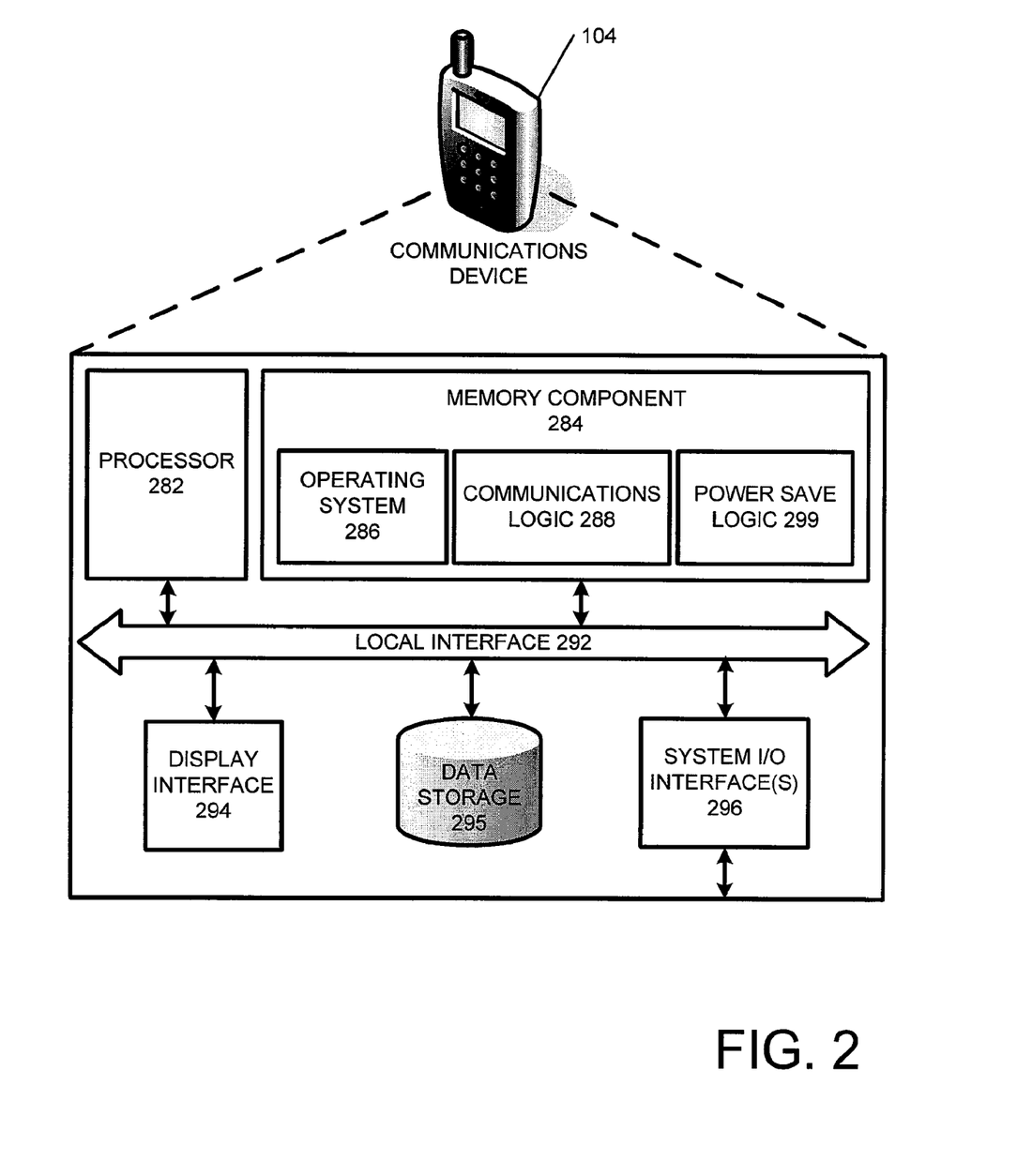
FIG. 2 is a functional block diagram illustrating an access point, similar to the analytic component from FIG. 1.

FIG. 2 is a functional block diagram illustrating a communications device, similar to the communications device from FIG. 1. As illustrated in FIG. 2, in terms of hardware architecture, the communications device 104 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/or other types of storage media. Note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include communications logic 288, power save logic 299, as well as an operating system 286, and a recording cache 297. Additionally, while the logic components 286, 288, and 290 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 284, so as to operate properly in connection with the Operating System 286.

The Input/Output devices that may be coupled to system I/O Interface(s) 296 may include input devices, for example but not limited to, a keyboard, mouse, scanner, microphone, camera, proximity device, receiver, etc. Further, the Input/Output devices may also include output devices, for example but not limited to, a printer, display, transmitter, etc. The Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 288, which is coupled to local interface 292, can be configured to communication with a communications network, such as the network from FIG. 1. While this communication may be facilitated via the communications device 104, this is not a requirement.

If the communications device 104 is a personal computer, workstation, or the like, the software in the memory component 284 may further include a basic input output system (BIOS) (omitted for simplicity). The BIOS is a set of software routines that initialize and test hardware at startup, start the Operating System 286, and support the transfer of data among the hardware devices. The BIOS is stored in ROM so that the BIOS can be executed when an access point 102 is activated.

When the communications device 104 is in operation, the processor 282 can be configured to execute software stored within the memory component 284, to communicate data to with the memory component 284, and to generally control operations of the communications device 104 pursuant to the software. Software in memory, in whole or in part, may be read by the processor 282, perhaps buffered within the processor 282, and then executed. Additionally, one should note that while the above description is directed to a communications device 104, other devices can also include the components described in FIG. 2.

One should note that the access point 102 can be configured with one or more of the components and/or logic described above with respect to the communications device 104. Additionally, the access point 102, the communications device 104, and/or other components of FIG. 1 can include voice recognition logic, voice-to-text logic, text-to-voice logic, etc. (or any permutation thereof), as well as other components and/or logic for facilitating the operations described herein.

Figure 3A:
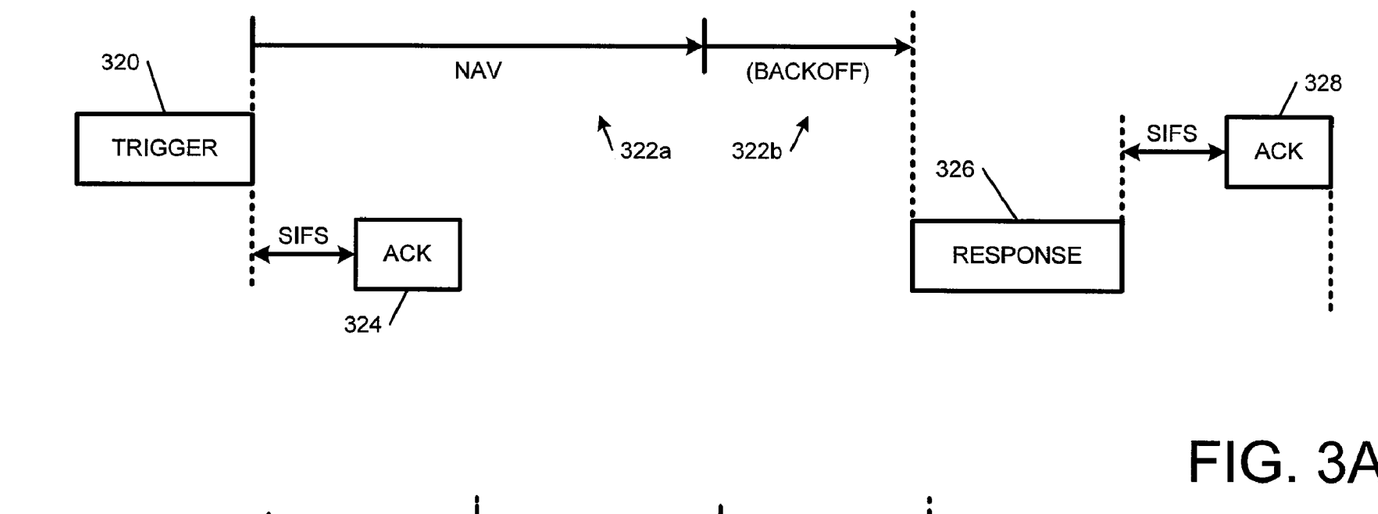
FIG. 3A is a diagram illustrating an exemplary embodiment of data frames that may be sent between a communications device and an access point.

FIG. 3A is a diagram illustrating an exemplary embodiment of data frames that may be sent between a communications device and an access point. As discussed above, current implementations consume an unnecessary amount of power by remaining in a receive and/or normal operation mode after a trigger frame is sent. However, as illustrated in the nonlimiting example of FIG. 3A, embodiments discussed herein can reduce power usage in the communications device 104 by entering a power save mode, as discussed below.

More specifically, the communications device 104 can send a trigger frame 320 to an access point 102. The communications device 104 can set a NAV 322a with the trigger frame. In at least one exemplary embodiment, the NAV 322a may be configured to define a turnaround time and a backoff. Similarly, in at least one exemplary embodiment, the NAV 322a may be configured to define a turnaround time and a backoff and a response frame exchange. Similarly, in at least one exemplary embodiment, the NAV 322a may be configured to define a period of communicative activity, with the understanding that the access point 102 can interpret this time as a period during which the client can not be reached. As discussed above, the communications device 104 may be configured to determine, based on the particular access point 102, a maximum turnaround time for receiving data from the access point 102. Similarly, some embodiments may be configured to determine an average turnaround time. Some embodiments may be configured to receive an indication of a turnaround time from the access point 102. Regardless, upon determining an anticipated turnaround time for the access point 102, the communications device can determine a NAV 336a (and thus a NAV duration) to set with the trigger frame 330. The communications device 104 can consider the turnaround time for the access point with an acknowledgment, including a Short Interframe Space (SIFS), as well.

After sending the trigger frame 320, the communications device 104 may experience a SIFS before receiving an acknowledgement 324 from the access point 102. The acknowledgement may be configured to indicate that the access point 102 received the data sent by the communications device 104. The communications device 104 can then await a response. As the communications device 104 defines a NAV duration in the trigger frame 320, the communications device 104 can enter a power save mode by shutting down one or more components (including, but not limited to a receiver and/or transmitter) until expiration of the time defined in the NAV 322, with the understanding that the access point 102 can interpret this time as a period during which the client can not be reached. As the access point 102 may not send the response 326 until after expiration of the NAV 322, the communications device 104 can remain in the power save mode until this time. After the NAV 322 has expired, the access point can send a response 326. After a SIFS, the communications device 104 can respond with an acknowledgement frame 328, which is sent to the access point 102.

Figure 3B:
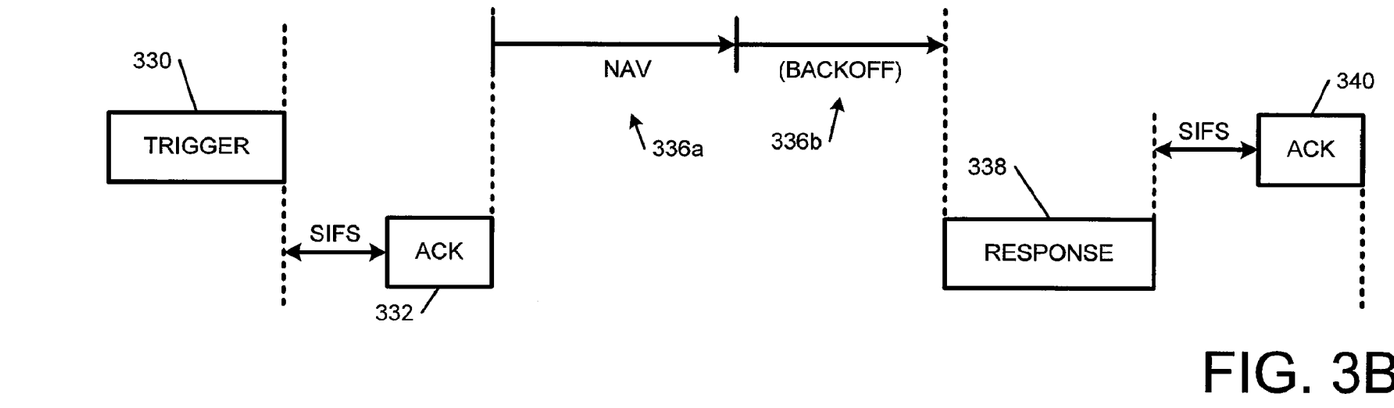
FIG. 3B is a diagram illustrating an exemplary embodiment of utilizing an access point acknowledgement to set a NAV, such as in the network from FIG. 1.

FIG. 3B is a diagram illustrating an exemplary embodiment of utilizing an access point acknowledgement to set a NAV, such as in the network from FIG. 1. As illustrated in the nonlimiting example of FIG. 3B, the communications device 104 can send a trigger frame 330 to the access point 102. The trigger frame 330 may be configured to set a NAV 336a and backoff 336b, such that the communications device 102 can enter a power save mode. After a SIFS, the access point 102 can send an acknowledgement 332 back to the communications device 104. Upon receiving the acknowledgement frame 332, the communications device 104 can enter a power save mode until the end of the NAV 336. The communications device 104 can then resume normal operation, receive the response 338 from the access point 102, and, after a SIFS, send an acknowledgement 340 back to the access point 102. The backoff 336b may be configured (in at least one exemplary embodiment) to be contained within the NAV 336a.

Figure 4:
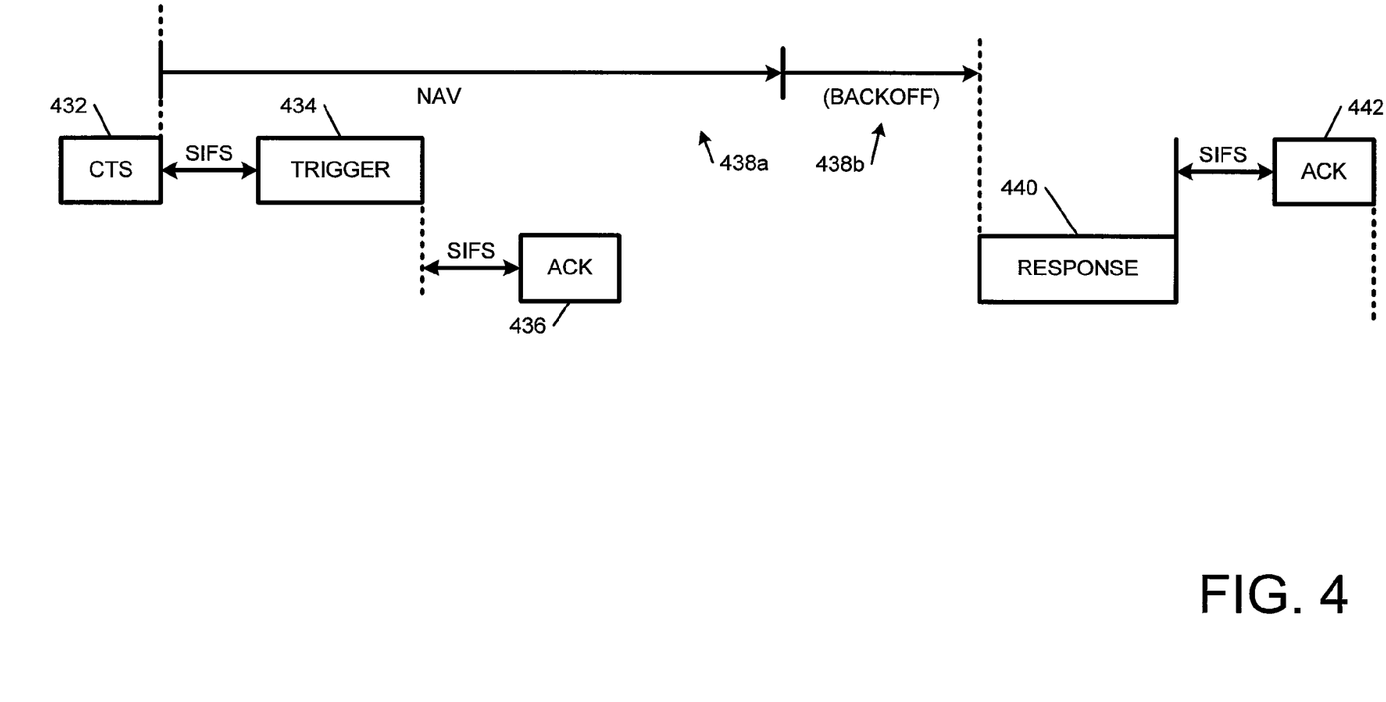
FIG. 4 is a diagram illustrating an exemplary embodiment of utilizing a Clear To Send (CTS) frame in setting a Network Allocation Vector (NAV), similar to the diagram of FIG. 3A.

FIG. 4 is a diagram illustrating an exemplary embodiment of utilizing a Clear To Send (CTS) frame in setting a Network Allocation Vector (NAV), similar to the diagram of FIG. 3A. While in the exemplary embodiment of FIG. 3A illustrates a configuration for setting a NAV 322a with a trigger frame 320, in this exemplary embodiment, the communications device 104 can set a NAV 438a with a CTS. More specifically, as illustrated in the nonlimiting example of FIG. 4, the communications device 104 can send a CTS frame 432, indicating that the communications device 104 is available for receiving data from the access point 102. In the CTS 432, the communications device 104 can set a NAV 438a, as well as a backoff 438b. The NAV 438 can indicate a time that includes a trigger duration, and acknowledgement duration and/or one or more SIFS. After the CTS 432, a SIFS may be experienced, followed by a trigger frame 434. Upon receiving the trigger frame 434 (and after a SIFS), the access point 102 can send an acknowledgement 436.

During the time period between receiving the acknowledgement 436 and the end of the duration set by the NAV 438, the communications device 104 can enter a power save mode. As indicated above, with power save mode the communications device 104 can conserve power by shutting down one or more components of the communications device 104. At the end of the NAV 438, the access point 102 can send a response 430. After a SIFS, the communications device 104 can send an acknowledgement 442, indicating receipt of the response 430.

Figure 5:
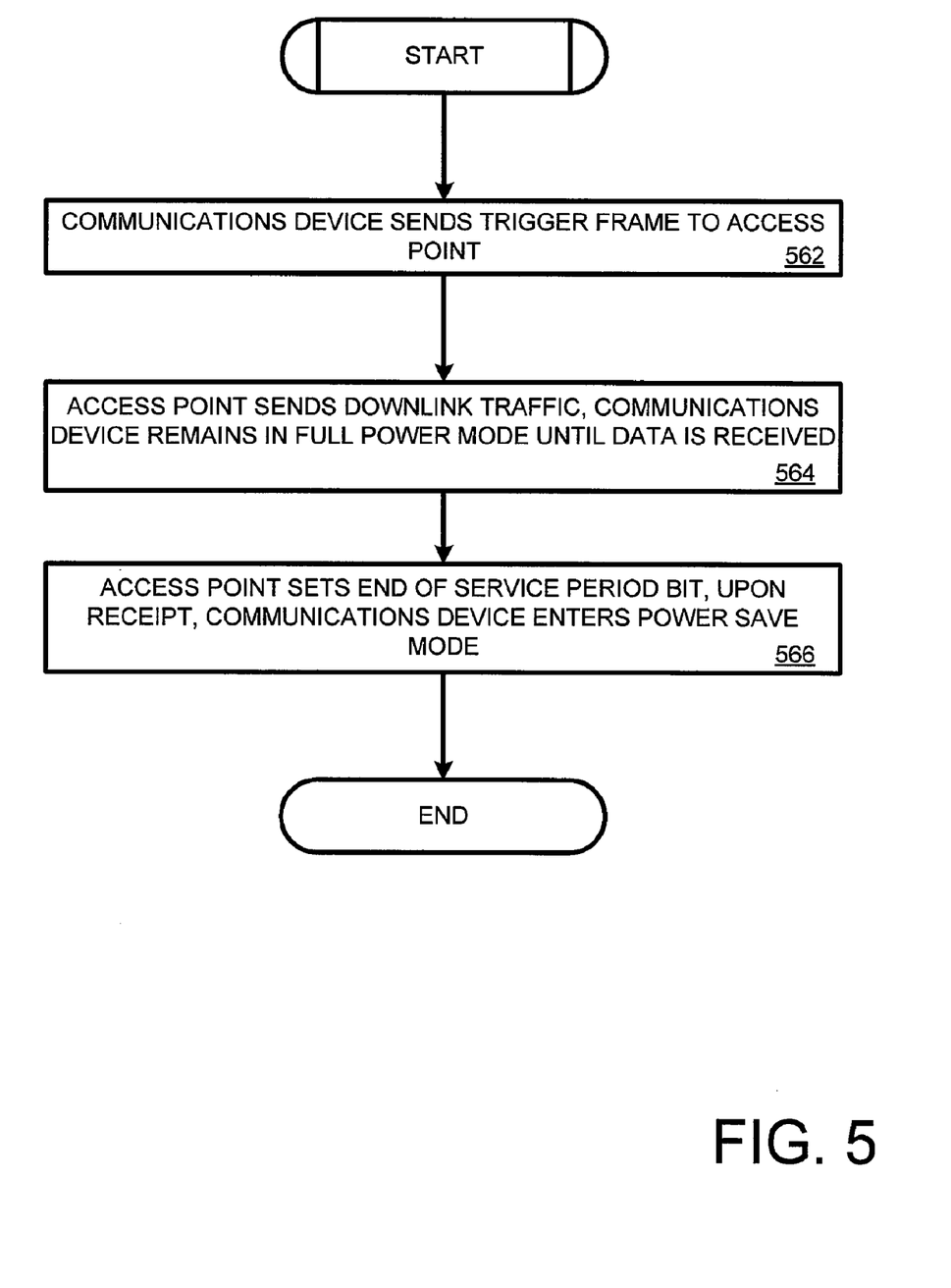
FIG. 5 is a flowchart illustrating an exemplary embodiment of a process that may be utilized for sending data to a communications device, such as a communications device from FIG. 1.

FIG. 5 is a flowchart illustrating an exemplary embodiment of a process that may be utilized for sending data to a communications device, such as a communications device from FIG. 1. As illustrated in the nonlimiting example of FIG. 5, the communications device 104 can send a trigger frame to the access point 102 (block 562). The access point 102 can then send downlink traffic. The communications device can remain in full power mode until the data is received (block 564). The access point 102 can set the End Of Service Period (EOSP) bit and, upon receipt, the communications device 102 can enter a power save mode (block 566). As discussed above, the configuration of FIG. 5 may consume unnecessary power, as the communications device 104 may remain in full power mode while waiting for a response from the access point 102.

Figure 6:
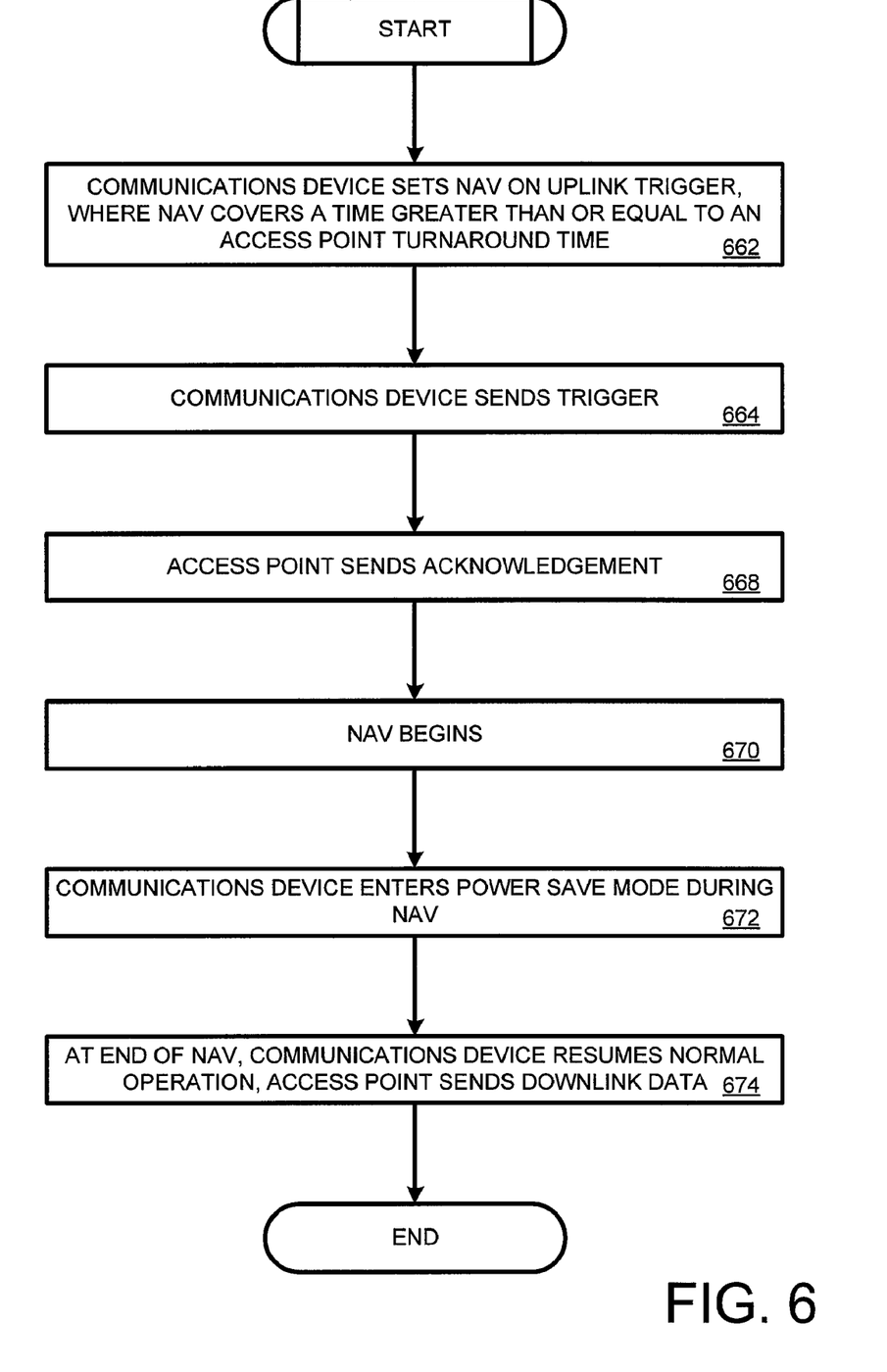
FIG. 6 is a flowchart illustrating an exemplary embodiment of a process that may be utilized for setting a NAV on a trigger frame, similar diagram from FIG. 3A.

FIG. 6 is a flowchart illustrating an exemplary embodiment of a process that may be utilized for setting a NAV on a trigger frame, similar diagram from FIG. 3A. As illustrated in the nonlimiting example of FIG. 6, the communications device 104 can set a NAV 322 on an uplink trigger frame 320, where the NAV 322 covers a time greater than or equal to an access point 102 turnaround time (block 662). The communications device 104 can then send a trigger frame 320 to the access point 102 (block 664). The access point 102 can receive the trigger frame 320 and send an acknowledgement frame 324 (block 668). The NAV 32 can then begin (block 670). Upon beginning the NAV 322, the communications device 104 can enter a power save mode until the end of the NAV 322 (block 672). At the end of the NAV 322, the communications device can resume normal operation and the access point 102 can send downlink data (block 674).

Figure 7:
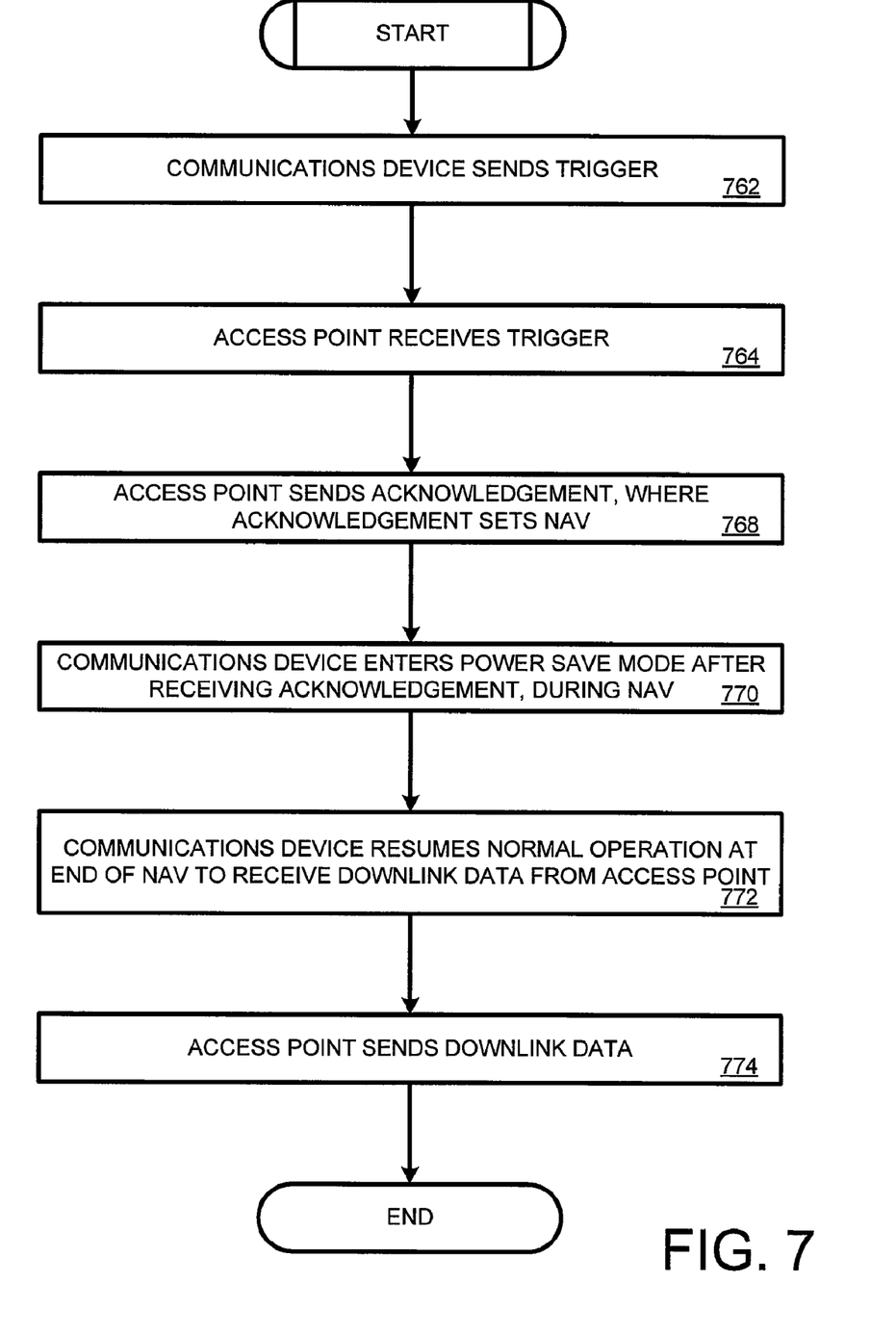
FIG. 7 is a flowchart illustrating an exemplary embodiment of a process that may be utilized for an access point to set a NAV on an acknowledgement frame, similar to the diagram from FIG. 3B.

FIG. 7 is a flowchart illustrating an exemplary embodiment of a process that may be utilized for an access point to set a NAV on an acknowledgement frame, similar to the diagram from FIG. 3B. More specifically, as illustrated in the nonlimiting example of FIG. 7, the communications device 104 can send a trigger 330 (block 762). The access point 102 can receive the trigger 330 (block 764). The access point 102 can send the acknowledgement frame 332, where the acknowledgment 332 sets a NAV 336 (block 768), which exceeds an existing NAV. The communications device 104 can then enter a power save mode after receiving the acknowledgement 332, during the NAV 336 (block 770). The communications device 104 can resume normal operation at the end of the NAV 336 to receive downlink data 338 from the access point 102 (block 772). The access point 102 can then send the downlink data 338 (block 774).

Figure 8:
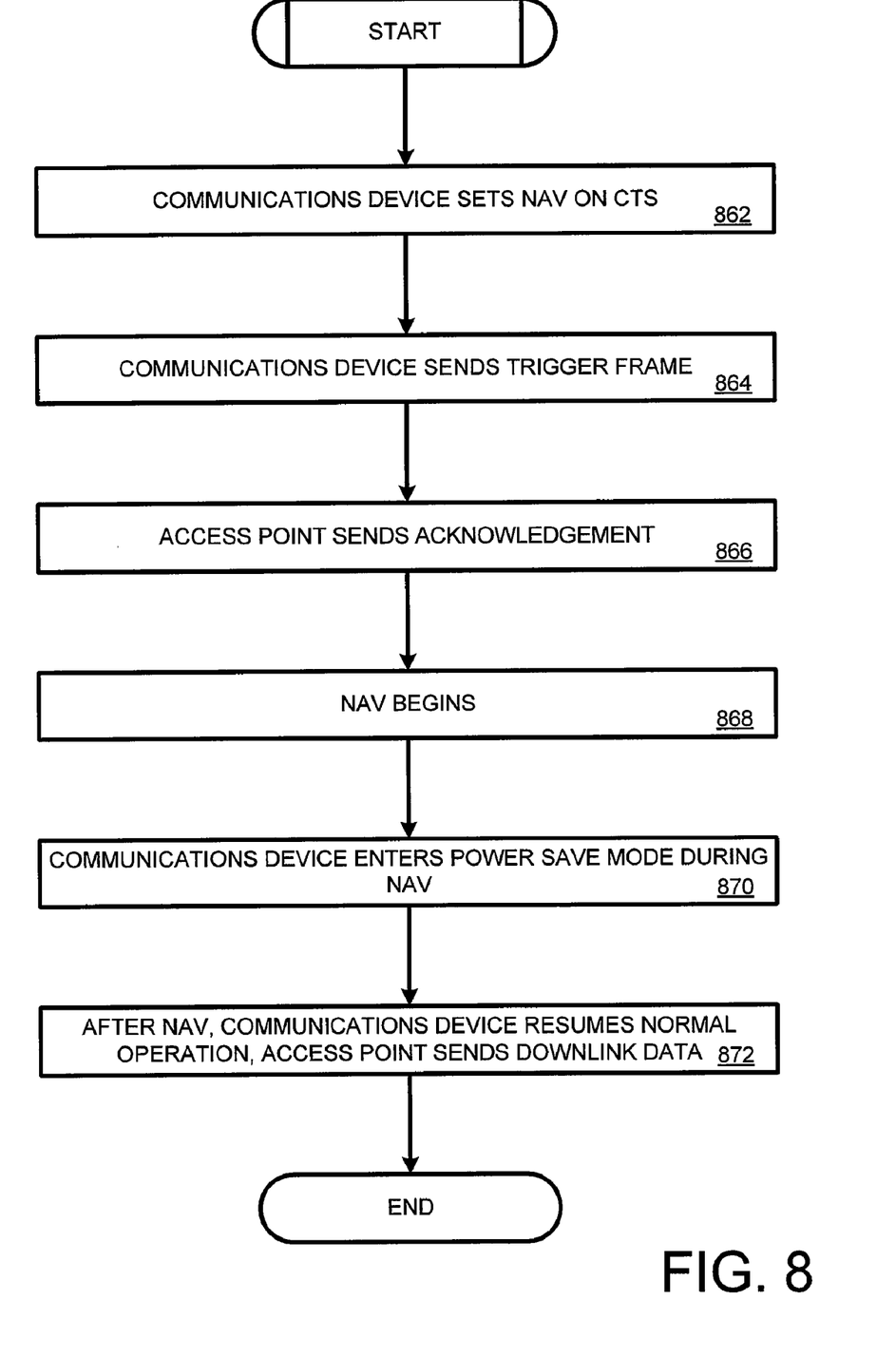
FIG. 8 is a flowchart illustrating an exemplary embodiment of a process that may be utilized for setting a NAV on a CTS frame, similar to the diagram from FIG. 4.

FIG. 8 is a flowchart illustrating an exemplary embodiment of a process that may be utilized for setting a NAV on a CTS frame, similar to the diagram from FIG. 4. As illustrated in the nonlimiting example of FIG. 8, the communications device 104 can set a NAV 438 on a CTS 432 (block 862). The communications device 104 can send a trigger frame 434 to the access point 102 (block 864). The access point 102 can send an acknowledgement 436 (block 866). The NAV 438 can begin (block 868). The communications device 104 can then enter power save mode, during the NAV 438 (block 870). After the NAV 438, the communications device 104 can resume normal operation and the access point 102 can send downlink data (block 872).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additionally, while certain devices are described as embodying various features of this disclosure, these are non-limiting examples. More specifically, components disclosed herein may be embodied in any wireless communication device, including computers (desktop, portable, laptop, etc.), consumer electronic devices (e.g., multi-media players), compatible telecommunications devices, personal digital assistants (PDAs), and/or other type of network devices, such as printers, fax machines, scanners, hubs, switches, routers, Set-Top Terminals (STTs), televisions with communications capabilities, etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method for operating in a wireless environment, comprising:
    sending a trigger frame to a second device;
    receiving an acknowledgement of the trigger frame from the second device;
    receiving a second data frame from the second device;
    determining, using a processor, a time period of communicative inactivity that corresponds to a turnaround time of the second device, wherein the turnaround time of the second device comprises a time between sending the acknowledgement and the second data frame, and wherein the turnaround time is based at least in part on the received second data frame;
    setting a first data frame for transmission from a first device to the second device, wherein the first device is configured to operate in a normal power mode that includes utilization of a plurality of active components, and wherein the first data frame includes the time period of communicative inactivity; and
    sending the first data frame to the second device.

2. The method of claim 1, further comprising facilitating utilization of a power save mode on the first device during the determined time period of communicative inactivity, wherein facilitating utilization of the power save mode includes shutting down at least one of the active components.

3. The method of claim 1, further comprising: resuming normal power mode associated with the first device, after expiration of the determined time period of communicative inactivity; and receiving a fourth data frame from the second device.

4. The method of claim 1, wherein the first data frame is a trigger frame.

5. The method of claim 1, wherein setting the first data frame includes setting a Net Allocation Vector (NAV).

6. The method of claim 1, wherein the first data frame is a Clear To Send (CTS) data frame.

7. The method of claim 1, wherein the first device includes a communications device.

8. The method of claim 1, wherein the second device includes an access point.

9. The method of claim 1, wherein the second data frame includes the turnaround time.

10. The method of claim 1, further comprising:
    sending a third data frame, wherein the second data frame is received in response to the third data frame;
    measuring a time between the sending of the third data frame and the receiving of the second data frame, wherein the measured time is the turnaround time.

11. The method of claim 1, further comprising:
sending multiple trigger frames to the second device;
receiving multiple acknowledgements in response to the sending of the multiple trigger frames;
receiving multiple data frames corresponding to the sending of multiple trigger frames; and
calculating multiple times, wherein each of the multiple times comprises a time between sending of an acknowledgement and a data frame corresponding to one of the multiple trigger frames, wherein the time period of communicative inactivity is based upon the multiple times.

12. A system for operating in a wireless environment, comprising:
means for sending a trigger frame to a second device;
means for receiving an acknowledgement of the trigger frame from the second device;
means for receiving a second data frame from the second device;
means for determining a time period of communicative inactivity that corresponds to a turnaround time of the second device, wherein the turnaround time of the second device comprises a time between sending the acknowledgement and the second data frame, and wherein the turnaround time is based at least in part on the received second data frame;
means for setting a first data frame for transmission from a first device to the second device, wherein the first device is configured to operate in a normal power mode that includes utilization of a plurality of active components, and wherein the first data frame includes the time period of communicative inactivity; and
means for sending the first data frame to the second device.

13. The system of claim 12, further comprising means for facilitating utilization of a power save mode on the first device during the determined time period of communicative inactivity, wherein facilitating utilization of the power save mode includes shutting down at least one of the active components.

14. The system of claim 12, further comprising:
means for resuming normal power mode associated with the first device, after expiration of the determined time period of communicative inactivity; and means for receiving a fourth data frame from the second device.

15. The system of claim 12, wherein the first data frame includes a trigger frame.

16. The system of claim 12, wherein means for setting the first data frame includes means for setting a Net Allocation Vector (NAV).

17. The system of claim 12, wherein the first data frame includes a Clear To Send (CTS) data frame.

18. The system of claim 12, wherein the first device includes a communications device.

19. The system of claim 12, wherein the second device includes an access point.

20. An apparatus comprising:
a transmitter configured to send a trigger frame to a second device;
a receiver configured to:
receive an acknowledgement of the trigger frame from the second device; and
receive a second data frame from the second device;
a processor configured to:
determine a time period of communicative inactivity that corresponds to a turnaround time of the second device, wherein the turnaround time of the second device comprises a time between sending the acknowledgement and the second data frame, and wherein the turnaround time is based at least in part on the received second data frame;
set a first data frame for transmission from a first device to the second device, wherein the first device is configured to operate in a normal power mode that includes utilization of a plurality of active components, and wherein setting the first data frame includes determining a time period of communicative inactivity; and
the transmitter further configured to send the first data frame to the second device.

21. The apparatus of claim 20, wherein the processor is further configured to facilitate utilization of a power save mode on the first device during the determined time period of communicative inactivity,
wherein facilitating utilization of the power save mode includes shutting down at least one of the active components.

22. The method of claim 11, further comprising calculating an average of the multiple of times, wherein the average is the time period of communicative inactivity.

23. The method of claim 11, further comprising calculating a maximum of the multiple of times, wherein the maximum is the time period of communicative inactivity.

* * * * *

UNITED STATES PATENT AND TRADEMARK OFFICE
CERTIFICATE OF CORRECTION

PATENT NO.        : 8,358,612 B2
APPLICATION NO.   : 11/686147
DATED             : January 22, 2013
INVENTOR(S)       : Wentink Page 1 of 1

It is certified that error appears in the above-identified patent and that said Letters Patent is hereby corrected as shown below:

In the Specification

In Column 7, Line 37, delete "device 102" and insert -- device 104 --, therefor.

In Column 8, Line 18, delete "device 102" and insert -- device 104 --, therefor.

In Column 8, Line 33, delete "NAV 32" and insert -- NAV 322 --, therefor.

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,358,612 B2 | Page 1 of 1 |
| APPLICATION NO. | : 11/686147 | |
| DATED | : January 22, 2013 | |
| INVENTOR(S) | : Menzo Wentink | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1504 days.

Signed and Sealed this
Sixteenth Day of December, 2014

Michelle K. Lee
*Deputy Director of the United States Patent and Trademark Office*